(12) United States Patent
Hennessey

(10) Patent No.: US 6,330,793 B1
(45) Date of Patent: Dec. 18, 2001

(54) EROSION RESISTANT ROCKET NOZZLE

(75) Inventor: Kent P. Hennessey, Fairfax, VA (US)

(73) Assignee: Atlantic Research Corporation, Gainesville, VA (US)

( * ) Notice: Subject to any disclaimer, the term of this patent is extended or adjusted under 35 U.S.C. 154(b) by 0 days.

(21) Appl. No.: 09/346,686

(22) Filed: Jul. 2, 1999

(51) Int. Cl.$^7$ ...................................................... F02R 1/00
(52) U.S. Cl. ........................................ 60/271; 239/265.11
(58) Field of Search ........................... 60/271; 239/265.11

(56) References Cited

U.S. PATENT DOCUMENTS

| | | |
|---|---|---|
| 3,140,584 | * 7/1964 | Ritchey et al. ................... 60/39.55 |
| 3,243,124 | * 3/1966 | Lee ........................................ 60/271 |
| 3,248,874 | 5/1966 | Grina . |
| 3,285,519 | 11/1966 | McKague, Jr. . |
| 3,302,884 | 2/1967 | Robinson . |
| 3,351,691 | 11/1967 | Wilford . |
| 3,441,217 | 4/1969 | McIntosh . |
| 3,639,159 | 2/1972 | Rose et al. . |
| 3,737,102 | 6/1973 | Garard et al. . |
| 5,490,629 | 2/1996 | Bonniot et al. . |
| 5,579,999 | * 12/1996 | Seiner et al. .................... 239/265.11 |

* cited by examiner

Primary Examiner—Charles G. Freay
(74) Attorney, Agent, or Firm—Nixon & Vanderhye PC; Frank P. Presta

(57) ABSTRACT

A rocket nozzle having an inlet, a middle region, a throat and an outlet, wherein a ratio of the cross-sectional area of the inlet to the throat is about 1.1. The middle region preferably has a shape which rises to an apex. Such a configuration places particles resulting from combustion on a trajectory which misses the wall of the nozzle at the throat or choke point, thereby decreasing throat erosion/ablation.

8 Claims, 3 Drawing Sheets

EROSION RESISTANT ROCKET NOZZLE

The present invention is directed to rocket motor nozzles, and more particularly to an improved rocket nozzle that reduces throat erosion/ablation.

BACKGROUND OF THE INVENTION

Rocket motor performance is a greatly dependent on rocket nozzle throat erosion. This erosion is caused by heat and corrosive gasses, but also particularly by combustion particles being propelled against the interior walls of the nozzle. As the erosion persists, the performance of the rocket motor tends to decrease.

To combat the undesirable erosion or ablation of the interior walls of rocket nozzles due to particle impact, there has been proposed in the prior art numerous interior protective liner schemes. For example, U.S. Pat. No. 3,737,102 to Garard et al. discloses a rocket nozzle having a layer of hard anodize coating over which is placed an ablative layer to produce a layer of cool gas alongside the nozzle walls during burning.

U.S. Pat No. 3,284,874 to Grina is similarly directed to an erosion resistant liner having a segmented construction in the form of frusto-conical sleeves capable of venting gasses accumulating at an insulator-liner interface.

In both of the above-noted patents emphasis is placed on protecting, directly, the interior wall of the nozzle. However, this approach requires relatively thick coatings or layers of specialized materials thereby adding additional weight to the overall vehicle to which the nozzle is attached. This material also adds additional expense. Moreover, the added weight detrimentally affects the performance of the rocket propelled vehicle.

SUMMARY OF THE INVENTION

It is therefore an object of the present invention to reduce the amount of protective materials incorporated in a rocket nozzle while reducing the amount of erosion that takes place within the rocket nozzle.

To achieve these and other objects, the present invention provides a rocket nozzle including a nozzle member having an inlet, a middle region, a throat and an outlet, wherein a ratio of the cross-sectional area of the inlet to the throat preferably is about 1.1.

Preferably the inlet and throat have smaller cross-sectional areas than the middle region. Stated alternatively, the middle region preferably has a cross-sectional area greater than that of either of the inlet or throat.

When the nozzle of the present invention is connected to a rocket motor which is fired, slag particles resulting from combustion are deflected or siphoned from a side wall of the throat, thereby reducing erosion of the throat area due to particle impact. Specifically, when the rocket motor is fired, flow velocities near the inner walls are reduced from centerline values by up to 4 times and at least ten-micron size combustion particles separate from the flow and skirt a forward face of inlet and the throat. Additionally, there is observed a relative low flow speed in a region bounded by the inlet, middle region and throat.

In a preferred embodiment, the rocket nozzle's middle region includes an apex and the inlet is curved. Furthermore, an intersection between the throat and middle region preferably is angular. These structural features together and/or alone provide the desired particle deflection and resulting reduction in erosion and ablation of the throat.

BRIEF DESCRIPTION OF THE DRAWINGS

The present invention will be more fully understood upon reading the following Detailed Description in conjunction with the accompanying figures, in which reference numerals are used consistently to indicate like elements, and in which.

DETAILED DESCRIPTION OF THE INVENTION

Rocket motor performance is a direct function of rocket nozzle throat erosion and improved motor performance can be achieved through improving (i.e., decreasing) the transient erosion/ablation rate of the nozzle. Conventional material used for rocket nozzle applications have a wide range in erosion resistance. However, high costs and poor structural properties preclude their use in many rocket motor applications.

In accordance with the present invention, however, improved erosion resistance of the throat region of a rocket nozzle has been made possible by specifically constructing the nozzle contour to prevent impingement of condensed phase combustion products on the throat region of the nozzle.

As condensed particles are often responsible for more than half the thermo-mechanical and chemical erosion experienced by solid propellant rocket nozzles, the present invention provides an improved nozzle contour that causes particles to miss the throat, thereby improving the performance of the overall rocket propelled vehicle.

Figure 1:
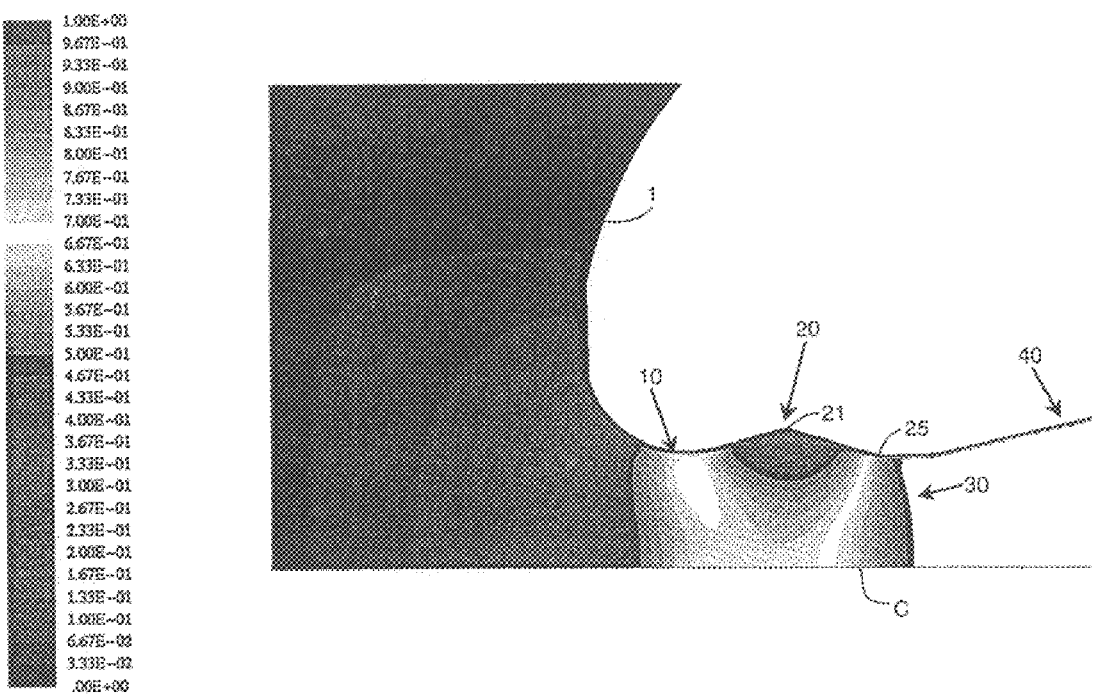
FIG. 1 shows an axi-symmetrical view of the nozzle of the present invention showing relative Mach numbers.
Figure 2:
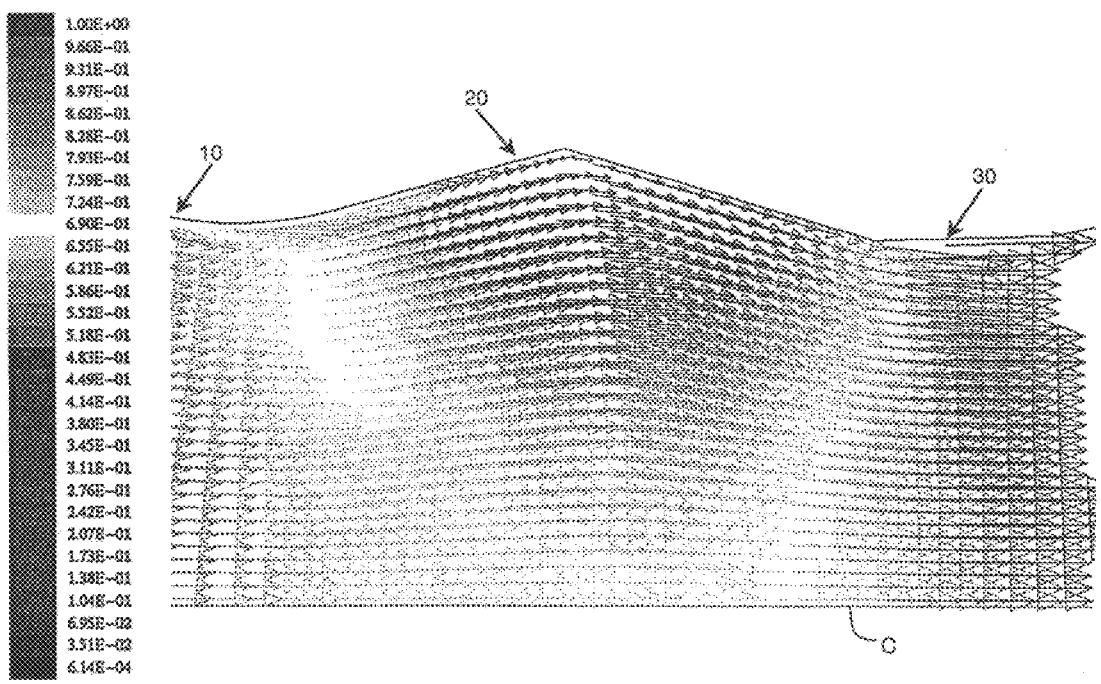
FIG. 2 shows an axi-symmetrical view of the nozzle of the present invention showing velocity vectors.
Figure 3:
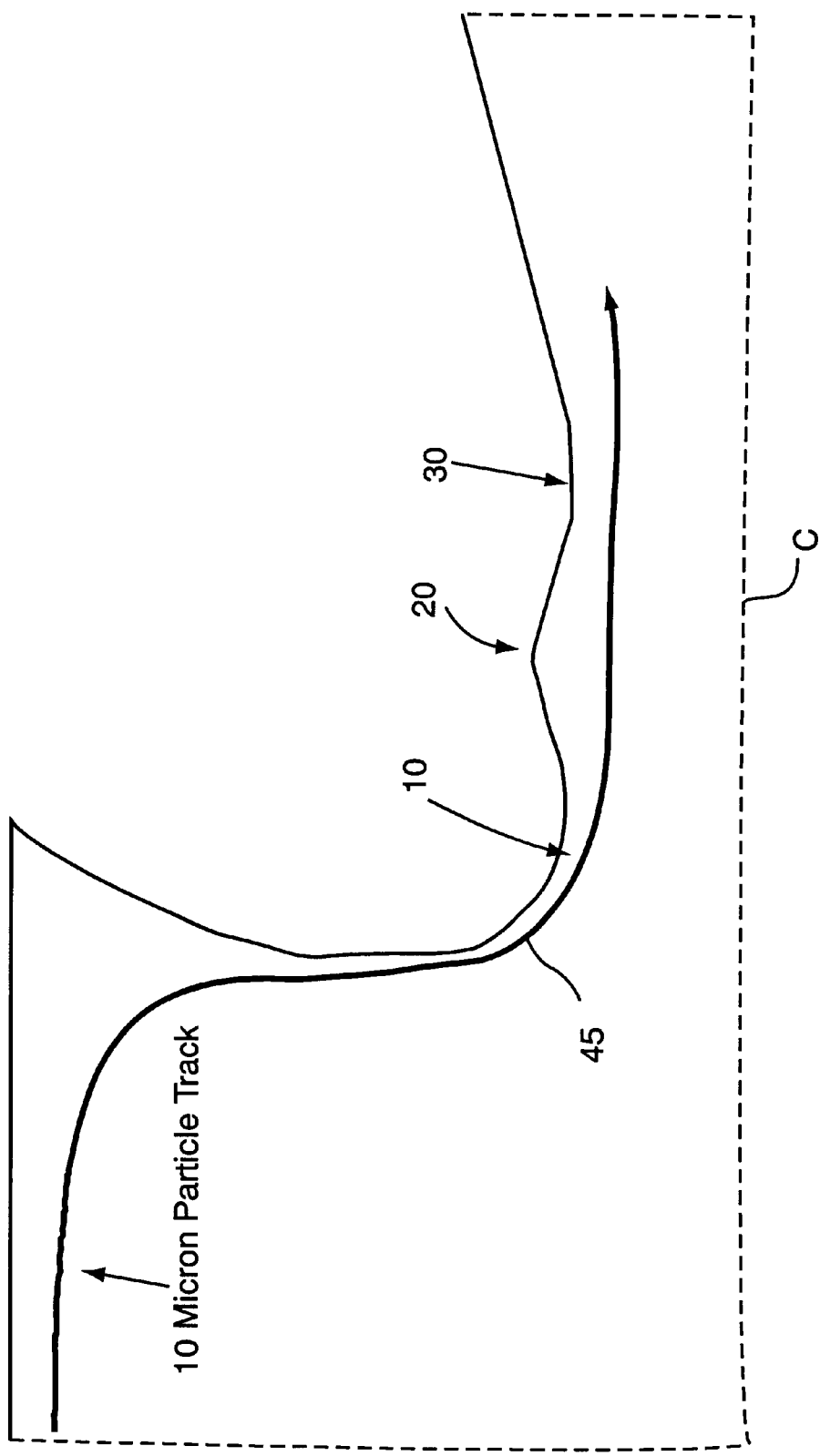
FIG. 3 shows the predicted trajectory of a 10 micron particle through the nozzle of the present invention.

FIGS. 1–3 show the preferred nozzle contour and the effects of that contour on gas flow and condensed particle trajectories. The figures depict results of axi-symmetric computational fluid dynamics (CFD) analysis of the preferred nozzle contour. The centerline C, or axis of symmetry, is shown in each of FIGS. 1–3 as a dashed line. The results of the analysis as well as actual testing clearly demonstrates the benefits of the present invention.

Specifically, FIG. 1 shows the cross-section of the preferred contour 1, with Mach number contours superimposed. The inlet 10 acts to accelerate condensed particles of alumina, for example, to high enough velocities such that their momentum will not permit impact on the throat 30, i.e., the Mach 1.0 point or choke point. In the preferred embodiment, the cross-sectional area ratio of the inlet 10 to the throat 30 is about 1.1. As shown clearly in FIG. 1, there is a low Mach number region in the space between the inlet 10, a middle region 20 and the throat 30. It is noted that, conventionally, the inlet 10 has a cross-sectional area similar to that of the middle region 20 such that there is a relatively long, sloping wall toward the throat/choke point 30. However, in accordance with an important aspect of the instant invention, and as is clearly seen in the figures, inlet 10 has been "pinched," which in combination with the other structural features of the nozzle of the present invention, result in the advantageous deflection of combustion particles away from the throat 30.

FIG. 1 also shows that the inlet 10 preferably is curved while the intersection 25 between the middle region 20 and throat 30 is angular. Further, middle region 20 extends to an apex 21 defined as the point of largest cross-sectional area in the middle region of the nozzle. The nozzle of the present invention also includes an outlet 40 that preferably is conical in shape, although any other suitable shape for the outlet may be used in accordance with the present invention.

FIG. 2 shows velocity vectors for the flow region between the inlet 10 and throat 30. As shown, there is relatively little, if any, impingement on the throat 30, and flow velocities are reduced from the centerline C values by up to four times. Specifically, low speed flow remains attached to the nozzle's interior surface, whereby no significant impingement on that surface, preferably comprising graphite, is observed.

FIG. 3 shows the predicted trajectory 45 of a ten micron size particle, e.g. alumina, passing through the nozzle of the instant invention. A ten micron particle was studied and is represented here as it is often the most likely particle size in the flow region of interest. As is depicted in the FIG. 3, the particle accelerates through the inlet 10 at a high angle to the centerline C. The resulting trajectory carries the particle away from the throat 30. However, combustion gas remains attached to the inside surface of the nozzle, as shown in FIG. 2. The nozzle contour in accordance with the present invention effectively siphons condensed particles away from the choke point (throat 30), while not allowing any aerodynamic reduction of the throat area (vena contracts).

The rocket nozzle in accordance with the present invention is particularly desirable to reduce erosion/ablation of carbon/graphite materials in liquid, solid and hybrid rocket motors and is also applicable to other propulsive applications such as gas generators, ramjets and scramjets. In any applications or use, the decreased throat erosion/ablation leads to improved unit performance.

The present invention has been described in terms of presently preferred embodiments so that an understanding of the present invention can be conveyed. The present invention should therefore not be seen as limited to the particular embodiments described herein. Rather, all modification, variations, or equivalent arrangements that are within the scope of the attached claims should be considered to be within the scope of the invention.

What is claimed is:

1. A rocket nozzle comprising:
   a nozzle member having an inlet, a middle region, a throat and an outlet;
   said middle region having a shape which defines an apex of greater cross-sectional area than that of said inlet and said throat;
   said inlet being curved; and
   the intersection between said middle region and said throat being angular;
   whereby when combustion gases are directed toward said inlet, solid particles therein are accelerated through said inlet at an angle to the centerline thereof and are siphoned away from the throat to prevent significant impingement thereon, while the flow velocity of combustion gases near said throat is reduced from the flow velocity of solid particles near the centerline thereof.

2. The rocket nozzle of claim 1, wherein a forward face of the inlet comprises graphite.

3. The rocket nozzle of claim 1 connected to a rocket motor.

4. The rocket nozzle of claim 3, wherein there is provided a relative low flow speed in a region bounded by the inlet, middle region and throat.

5. The rocket nozzle of claim 3, wherein the rocket motor is one of a liquid fuel, solid fuel and hybrid rocket motor.

6. The rocket nozzle of claim 1 attached to at least one of a gas generator, ramjet and scramjet.

7. The rocket nozzle of claim 1 wherein a ratio of the cross-sectional area of said inlet to said throat is about 1.1.

8. The rocket nozzle of claim 1 wherein the flow velocity of combustion gases near said throat is reduced from the centerline flow velocity of solid particles by values up to 4 times.

* * * * *